(12) United States Patent
Yogo et al.

(10) Patent No.: US 10,537,926 B2
(45) Date of Patent: Jan. 21, 2020

(54) BENDING APPARATUS

(71) Applicant: OPTON CO., LTD., Seto-shi, Aichi (JP)

(72) Inventors: Teruaki Yogo, Seto (JP); Sadayoshi Ozeki, Seto (JP)

(73) Assignee: OPTON CO., LTD, Seto-Shi, Aichi (JP)

( * ) Notice: Subject to any disclaimer, the term of this patent is extended or adjusted under 35 U.S.C. 154(b) by 0 days.

(21) Appl. No.: 15/555,182

(22) PCT Filed: Mar. 1, 2016

(86) PCT No.: PCT/JP2016/056260
§ 371 (c)(1),
(2) Date: Sep. 1, 2017

(87) PCT Pub. No.: WO2016/140222
PCT Pub. Date: Sep. 9, 2016

(65) Prior Publication Data
US 2018/0050375 A1    Feb. 22, 2018

(30) Foreign Application Priority Data
Mar. 2, 2015 (JP) ................. 2015-040511

(51) Int. Cl.
*B21D 7/00* (2006.01)
*B21D 7/02* (2006.01)
(Continued)

(52) U.S. Cl.
CPC .............. *B21D 7/02* (2013.01); *B21D 7/12* (2013.01); *B21D 37/04* (2013.01); *B25J 9/046* (2013.01);
(Continued)

(58) Field of Classification Search
CPC .......... B21D 5/002; B21D 7/02; B21D 7/024; B21D 7/12; B21D 11/22
See application file for complete search history.

(56) References Cited

U.S. PATENT DOCUMENTS 5,182,932 A    2/1993 Ritter et al.
5,291,771 A    3/1994 Tomo et al.
(Continued)

FOREIGN PATENT DOCUMENTS

EP    0419441 A1    3/1991
FR    2914203 A1    10/2008
(Continued)

OTHER PUBLICATIONS

International Search Report for International Patent Application No. PCT/JP2016/056260 (Form PCT/ISA/210), dated May 17, 2016 (4 pages including English translation).
(Continued)

*Primary Examiner* — Debra M Sullivan
(74) *Attorney, Agent, or Firm* — Withrow & Terranova, P.L.L.C.; Vincent K. Gustafson (57) ABSTRACT

A bending apparatus in one aspect of the present disclosure comprises a robot, a chuck mechanism, and a plurality of bending mechanisms. The plurality of bending mechanisms are each provided as a separate component from the robot and the chuck mechanism, and are arranged in a space reachable by a workpiece held by the chuck mechanism.

16 Claims, 7 Drawing Sheets

(51) Int. Cl.
*B21D 7/12* (2006.01)
*B21D 37/04* (2006.01)
*B25J 9/04* (2006.01)
*B25J 11/00* (2006.01)
*B25J 15/00* (2006.01)

(52) U.S. Cl.
CPC ......... *B25J 11/005* (2013.01); *B25J 15/0028* (2013.01); *Y10S 901/15* (2013.01); *Y10S 901/16* (2013.01); *Y10S 901/23* (2013.01); *Y10S 901/31* (2013.01)

(56) References Cited

U.S. PATENT DOCUMENTS

| | | | |
|---|---|---|---|
| 9,321,179 B2 | 4/2016 | Inoue | |
| 2010/0307214 A1* | 12/2010 | Yogo | B21D 7/024 72/319 |
| 2014/0318298 A1 | 10/2014 | Inoue | |
| 2017/0266864 A1* | 9/2017 | Steiner | B29C 53/083 |

FOREIGN PATENT DOCUMENTS

| | | |
|---|---|---|
| JP | H05-65440 U | 8/1993 |
| JP | H09300269 A | 11/1997 |
| JP | H10-58051 A | 3/1998 |
| JP | 2008-036676 A | 2/2008 |
| JP | 2008036675 A | 2/2008 |
| JP | 2012-228714 A | 11/2012 |
| JP | 2014213437 A | 11/2014 |
| WO | 2005016754 A1 | 2/2005 |
| WO | 2006049165 A1 | 5/2006 |

OTHER PUBLICATIONS

International Preliminary Report on Patentability (Forms PCT/IB/338, PCT/IB/373, and PCT/ISA/237) for International Patent Application No. PCT/JP2016/056260, dated Sep. 14, 2017, 6 pages.
Extended European Search Report for European Patent Application No. 16758915.9, dated Oct. 29, 2018, 8 pages.
Examination Report for Taiwanese Patent Application No. 105106172, dated Nov. 14, 2018, 11 pages.
Notification of Reasons for Refusal for Japanese Patent Application No. 2015-040511, dated Mar. 12, 2019, 9 pages.
Decision of Refusal for Japanese Patent Application No. 2015-040511, dated Aug. 20, 2019, 10 pages including English translation.

* cited by examiner

BENDING APPARATUS

CROSS-REFERENCE TO RELATED APPLICATIONS

This application is a 35 U.S.C. § 371 national phase filing of International Application No. PCT/JP2016/056260 filed on Mar. 1, 2016, and claims the benefit of Japanese Patent Application No. 2015-040511 filed on Mar. 2, 2015 with the Japan Patent Office. The entire disclosures of International Application No. PCT/JP2016/056260 and Japanese Patent Application No. 2015-040511 are hereby incorporated by reference herein in their respective entireties.

TECHNICAL FIELD

The present disclosure relates to a bending apparatus to bend an elongated workpiece.

BACKGROUND ART

There has been known a bending apparatus that is provided with a bending mechanism including a bending die and a clamping die, which engages with the bending die, and clamps an elongated workpiece with the bending die and the clamping die to thereby bend the workpiece.

An example of a bending apparatus described in Patent Document 1 below is provided with a chuck that holds an end of a workpiece and also rotates the workpiece in a circumferential direction and provided with a rail on which the chuck moves.

In this example, the chuck holding the workpiece is moved to thereby change a point to be bent, and the chuck is also rotated to change a bending direction in a radial direction of the workpiece.

PRIOR ART DOCUMENTS

Patent Documents

Patent Document 1: Japanese Unexamined Patent Application Publication No. H10-058051

SUMMARY OF THE INVENTION

Problems to be Solved by the Invention

A bending apparatus is generally required to be able to bend a workpiece into a complicated shape after the bending.

To obtain a complicated shape after bending, it is necessary to perform bending of a single workpiece at a plurality of points. In a case of performing bending at a plurality of points using a conventional bending apparatus, bending may be performed while sequentially changing points to be bent starting from one end of the workpiece.

However, when bending is performed by the above-described method using the conventional bending apparatus, bending at desired points may not be achieved due to an interference between the workpiece and the bending apparatus.

That is, it is required in the conventional bending apparatus to increase a degree of freedom in bending of a workpiece.

Accordingly, in one aspect of the present disclosure, it is desired to provide a bending apparatus that achieves an improved degree of freedom in bending of a workpiece.

Means for Solving the Problems

One aspect of the present disclosure relates to a bending apparatus to bend a workpiece having an elongated shape. The bending apparatus comprises a robot, a chuck mechanism, and a plurality of bending mechanisms.

The robot comprises an articulated arm. The chuck mechanism is coupled to one end of the articulated arm, and is configured to hold the workpiece. The plurality of bending mechanisms each comprise a bending die and a clamping die to engage with the bending die. Each of the plurality of bending mechanisms is configured to bend the workpiece by clamping the workpiece with the bending die and the clamping die.

Also, the plurality of bending mechanisms are each provided as a separate component from the robot and the chuck mechanism, and are arranged in a space reachable by the workpiece held by the chuck mechanism.

The bending apparatus configured as described above enables movement (conveyance) of the workpiece with the articulated arm of the robot. The articulated arm can move the workpiece along a plurality of axes. Thus, the bending apparatus can achieve an improved degree of freedom of movement (conveyance) of the workpiece as compared with a movement of a chuck on a rail in conventional techniques.

Further, the plurality of bending mechanisms are arranged in the bending apparatus. By using bending mechanisms having different respective bending radii or bending mechanisms having different respective bending directions, as the plurality of bending mechanisms, variations in bending of the workpiece can be increased.

Moreover, according to the bending apparatus, a point of bending and a direction along a radial direction of bending in the workpiece may be determined depending on an operation mode of the articulated arm; thus, variations in the point of bending and the direction along the radial direction of bending in the workpiece can be increased.

That is, according to the bending apparatus, a variety of bending of the workpiece can be achieved depending on an arrangement mode of the bending mechanisms, a mode of the bending radius and the bending direction of each of the bending mechanisms, and the operation mode of the articulated arm.

In other words, according to the bending apparatus, an improved degree of freedom in bending of the workpiece can be achieved as compared with the conventional techniques.

Also, the bending apparatus may comprise a controller configured to control driving of the robot, the chuck mechanism, and the plurality of bending mechanisms.

According to the bending apparatus configured as described above, the driving of the robot, the chuck mechanism, and the plurality of bending mechanisms can be controlled through the controller.

The controller of the bending apparatus may drive the articulated arm of the robot such that the workpiece held by the chuck mechanism is moved to a position at which the workpiece becomes clampable by the bending die and the clamping die. Further, the controller may control the driving of the robot, the chuck mechanism, and the plurality of bending mechanisms so as to cause the bending die and the clamping die to clamp the workpiece.

That is, according to the bending apparatus configured as described above, the robot, the chuck mechanism, and the bending mechanisms can be driven in an interlocking manner. Thus, the bending apparatus can achieve bending of the workpiece with higher accuracy.

In the bending apparatus, the plurality of bending mechanisms may comprise two bending mechanisms or may comprise three bending mechanisms.

According to the bending apparatus configured as described above, variations in feasible bending shapes of the workpiece can be increased by using bending dies and clamping dies having different respective bending radii in the plurality of bending mechanisms, and by setting reversed bending directions in the plurality of bending mechanisms.

Further, the articulated arm in the bending apparatus may comprise at least one bending joint configured to perform a bending motion and at least one rotary joint configured to perform a turning motion.

According to the bending apparatus configured as described above, the bending joint and the rotary joint enables to more surely improve a degree of freedom in operation of the articulated arm, and thus a degree of freedom in bending of the workpiece.

In particular, a six-axis vertical multi-articulated robot may be employed as the robot in the bending apparatus. By employing the six-axis vertical multi-articulated robot, an improved degree of freedom in operation of the articulated arm, and thus an improved degree of freedom in bending of the workpiece can be achieved.

EXPLANATION OF REFERENCE NUMERALS

1 . . . bending apparatus, 3 . . . workpiece, 8 . . . machine base, 10 . . . robot, 12 . . . articulated arm, 14 . . . base portion, 16 . . . body portion, 18 . . . upper arm, 20 . . . forearm, 22 . . . first forearm, 24 . . . second forearm, 26 . . . hand attachment portion, 28 . . . hand distal end, 30 . . . first joint, 32 . . . second joint, 34 . . . third joint, 36 . . . fourth joint, 38 . . . fifth joint, 40 . . . sixth joint, 42 . . . robot controller, 50 . . . chuck unit, 52 . . . gear box, 53 . . . distal rotary shaft, 54 . . . input gear, 55 . . . output shaft, 56 . . . output gear, 58 . . . casing, 60 . . . bracket, 62 . . . chuck mechanism, 64 . . . first claw portion, 66 . . . second claw portion, 68 . . . bearing, 70 . . . first bending mechanism, 72 . . . bending die, 74 . . . clamping die, 76 . . . power generation mechanism, 78 . . . bending mechanism base, 80 . . . second bending mechanism, 90 . . . control unit, 92 . . . input device, 94 . . . input controller

MODE FOR CARRYING OUT THE INVENTION

Figure 1:
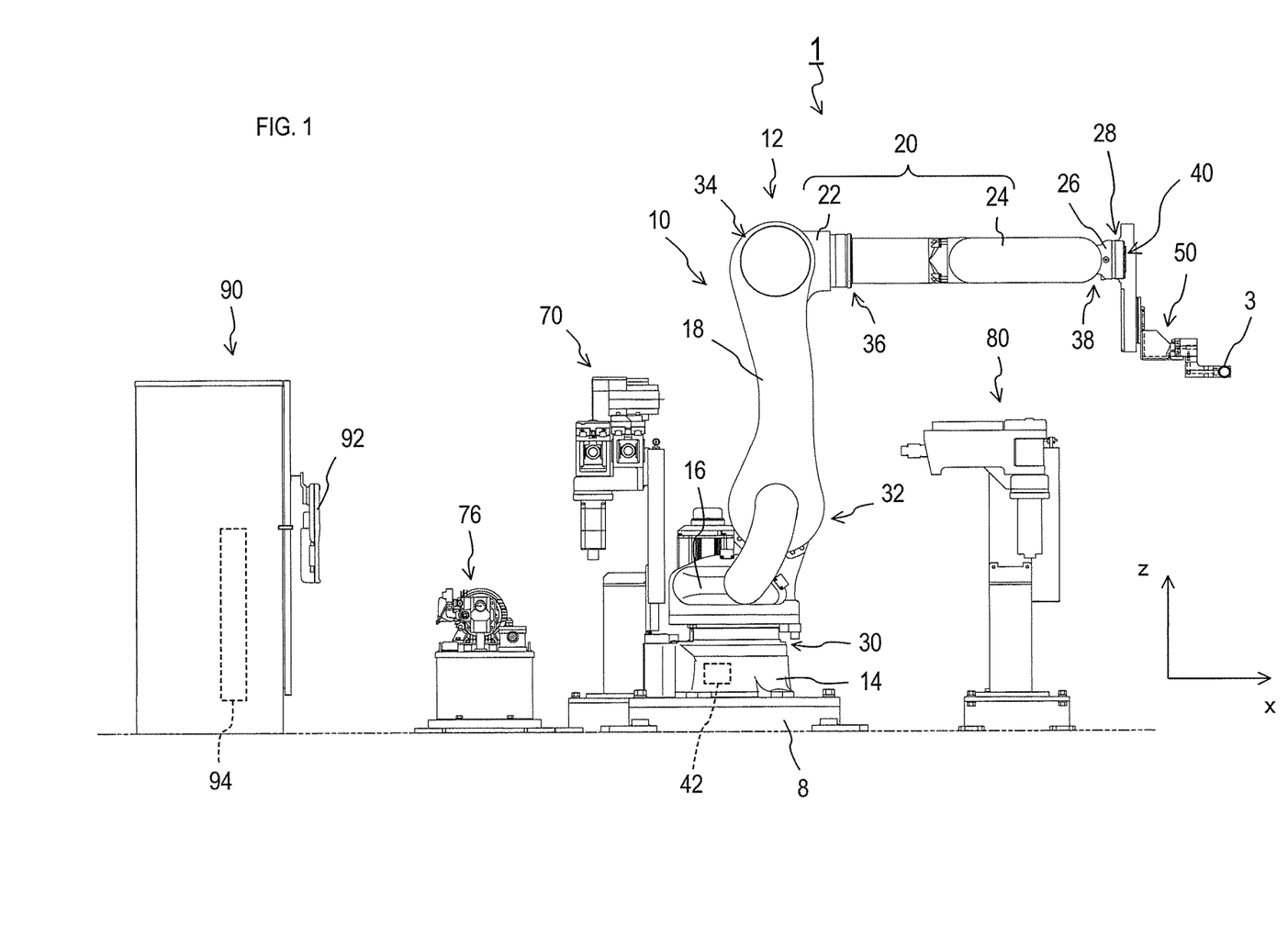
FIG. 1 is a schematic front view of a bending apparatus.
Figure 2:
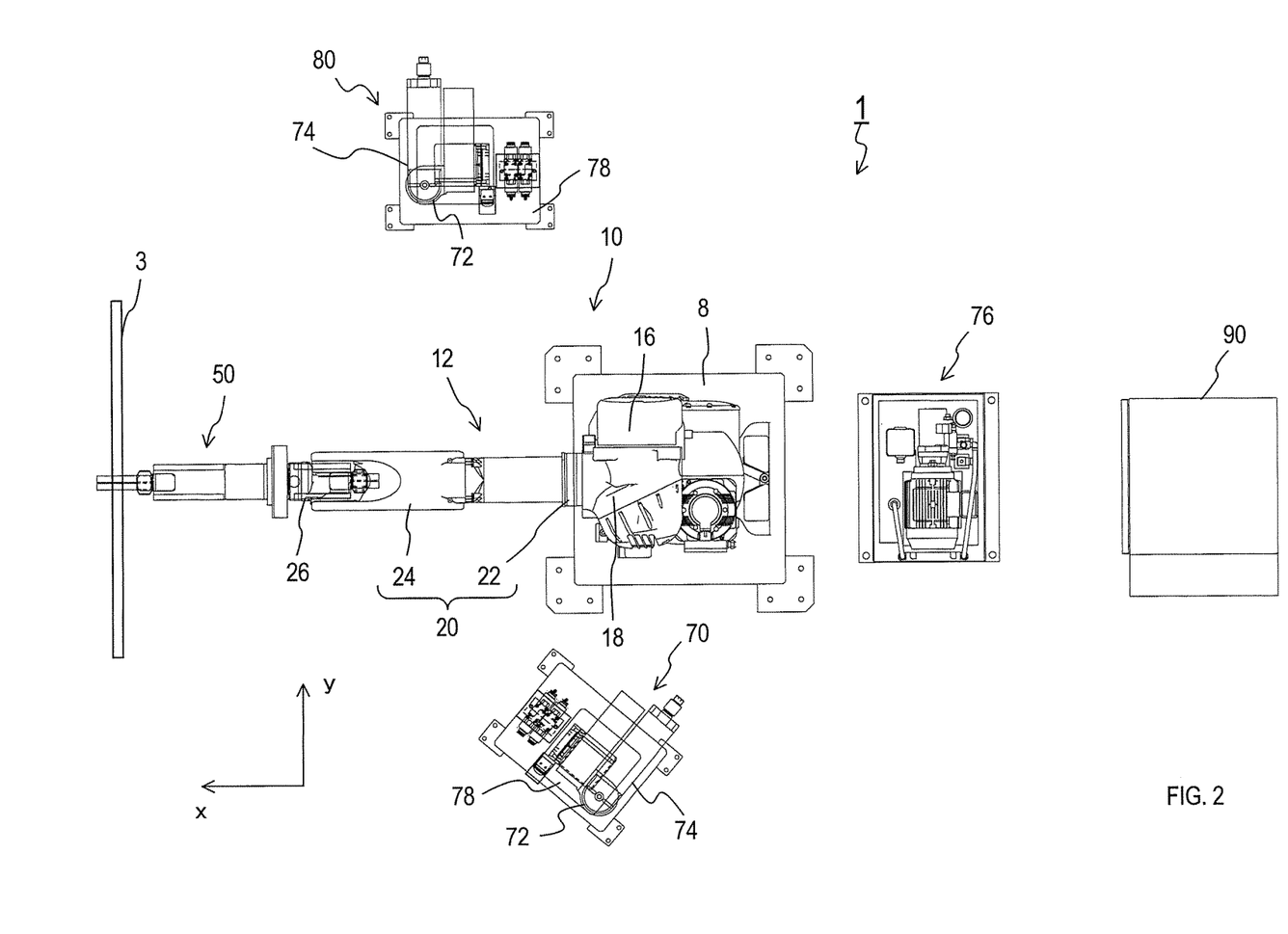
FIG. 2 is a schematic plan view of the bending apparatus.

Hereinafter, an example embodiment of the present disclosure will be described with reference to the drawings.
<Bending Apparatus>
A bending apparatus 1 shown in FIG. 1 and FIG. 2 is an apparatus to bend a workpiece 3 having an elongated shape into a specified shape. Examples of the workpiece 3 in the present embodiment include a tubular member (a pipe) and a rod member.

The bending apparatus 1 comprises a robot 10, a chuck unit 50, a first bending mechanism 70, a second bending mechanism 80, and a control unit 90.
<Robot>

A robot 10, which is an industrial robot to be secured to a machine base 8 comprising a specified installation surface, comprises an articulated arm 12.

The articulated arm 12 comprises a base portion 14, a body portion 16, an upper arm 18, a forearm 20, a hand attachment portion 26, a first joint 30, a second joint 32, a third joint 34, a fourth joint 36, a fifth joint 38, a sixth joint 40, and a robot controller 42. The articulated arm 12 is an arm that comprises movable portions having respective six axes in an orthogonal coordinate system (an x, y, z coordinate system).

The base portion 14 is a base to be mounted to the machine base 8.

The body portion 16 is mounted to the base portion 14 through the first joint 30. The first joint 30 is a well-known mechanism to rotate the body portion 16 around an axis (a z-axis) of the base portion 14. That is, the body portion 16 is configured to be turnable relative to the base portion 14.

The upper arm 18 has an arm shape. One end of the upper arm 18 is mounted to the body portion 16 through the second joint 32. The second joint 32 is a well-known mechanism to rotate the upper arm 18 by a specified angle around an axis perpendicular to a rotation axis of the first joint 30. That is, the upper arm 18 is configured to be able to perform a bending motion relative to the body portion 16.

Also, the forearm 20, which generally has an arm shape, comprises a first forearm 22 and a second forearm 24.

The first forearm 22 is coupled, through the third joint 34, to an end of the upper arm 18 that is opposite to the one end where the second joint 32 is provided. The third joint 34 is a well-known mechanism to rotate the first forearm 22 by a specified angle, around an axis parallel to a rotation axis of the second joint 32. That is, the first forearm 22 is configured to be able to perform a bending motion relative to the upper arm 18.

Further, the second forearm 24 is mounted, through the fourth joint 36, to an end of the first forearm 22 that is opposite to an end where the third joint 34 is provided. The fourth joint 36 is a well-known mechanism to rotate the second forearm 24 by a specified angle around an axis perpendicular to a rotation axis of the third joint 34. That is, the second forearm 24 is configured to be able to perform a turning motion relative to the first forearm 22.

The chuck unit 50 is mounted to the hand attachment portion 26. The hand attachment portion 26 is mounted, through the fifth joint 38, to an end of the second forearm 24 that is opposite to an end where the fourth joint 36 is provided. The fifth joint 38 is a well-known mechanism to rotate the hand attachment portion 26 by a specified angle around an axis perpendicular to a rotation axis of the fourth joint 36.

Further, the sixth joint 40 is provided at an end (hereinafter referred to as a "hand distal end") 28 of the hand attachment portion 26 that is opposite to an end where the fifth joint 38 is provided. The sixth joint 40 is a well-known mechanism to rotate by a specified angle around an axis perpendicular to a rotation axis of the fifth joint 38.

That is, the hand attachment portion 26 is configured to be able to perform a bending motion relative to the second forearm 24, and is also configured to enable a turning motion of the hand distal end 28.

The first joint 30, the second joint 32, the third joint 34, the fourth joint 36, the fifth joint 38, and the sixth joint 40 in the present embodiment each have at least a motor and a rotary encoder. The joints 30, 32, 34, 36, 38, and 40 are rotated by respective motors. Respective rotation angles of the respective motors are detected by respective rotary encoders.

As described above, the robot 10 of the present embodiment is a so-called six-axis vertical multi-articulated robot.

In the articulated arm 12 of the robot 10, the base portion 14 turns relative to the machine base 8 (the body portion 16), and the upper arm 18 performs a bending motion relative to the base portion 14. Also, in the articulated arm 12, the first forearm 22 performs a bending motion relative to the upper arm 18, and the second forearm 24 turns relative to the first forearm 22. Further, the hand attachment portion 26 performs a bending motion relative to the second forearm 24, and the hand distal end 28 of the hand attachment portion 26 performs a rotating motion.

That is, according to the robot 10, the hand distal end 28 is moved to a specified position in a three-dimensional space with high accuracy. This enables a "feeding" operation to feed the workpiece 3 with high accuracy in the bending apparatus 1.

The first joint 30, the fourth joint 36, and the sixth joint 40 in the present embodiment are examples of rotary joints that each perform a turning motion. Also, the second joint 32, the third joint 34, and the fifth joint 38 are examples of bending joints that each perform a bending motion.

Further, the robot controller 42 comprises a well-known microcomputer comprising a ROM, a RAM, and a CPU. The robot controller 42 controls the respective joints 30, 32, 34, 36, 38, and 40, and others provided to the robot 10.

<Chuck Unit>

Figure 3:
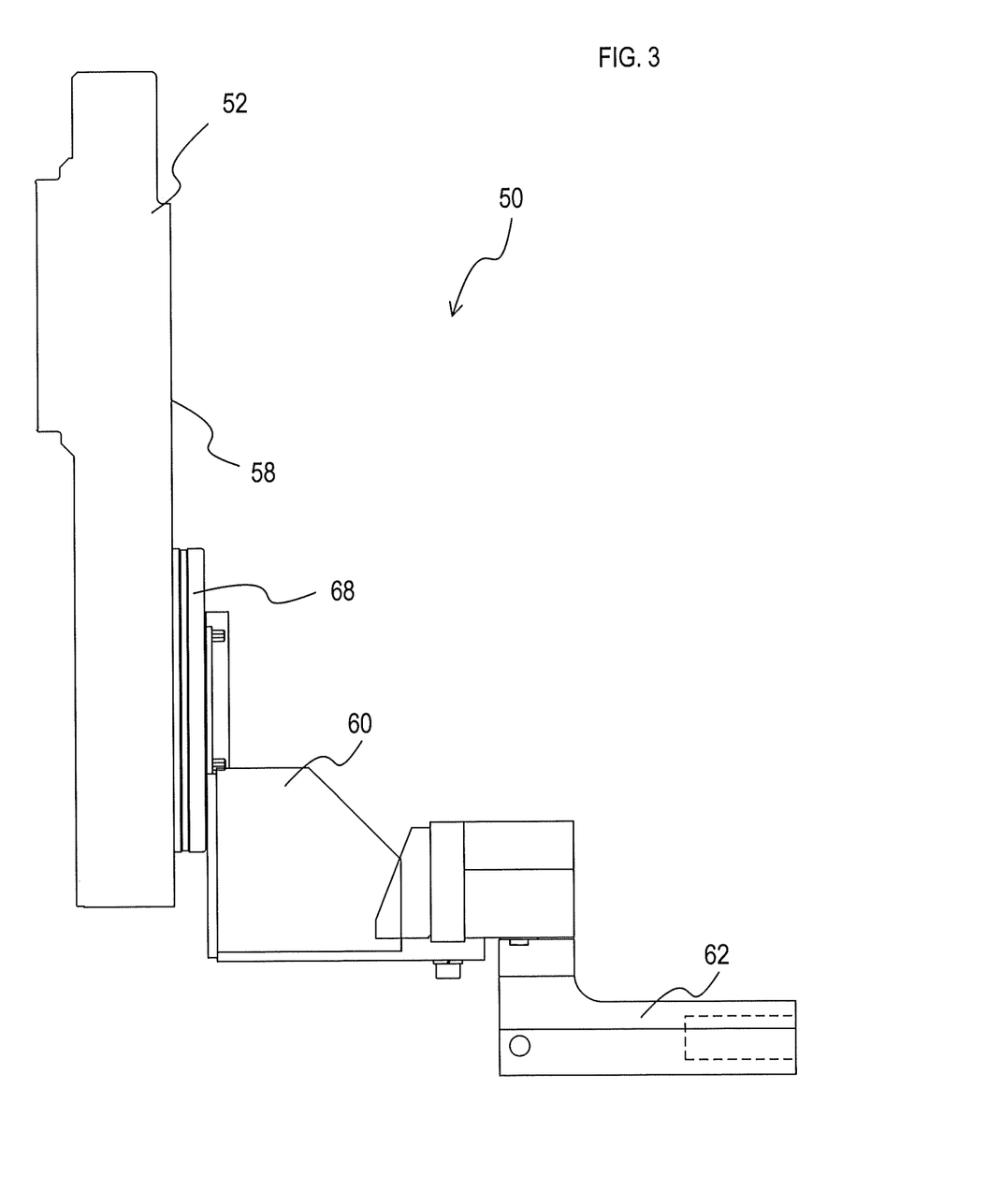
FIG. 3 is a view showing a schematic appearance of a chuck unit.
Figure 4:
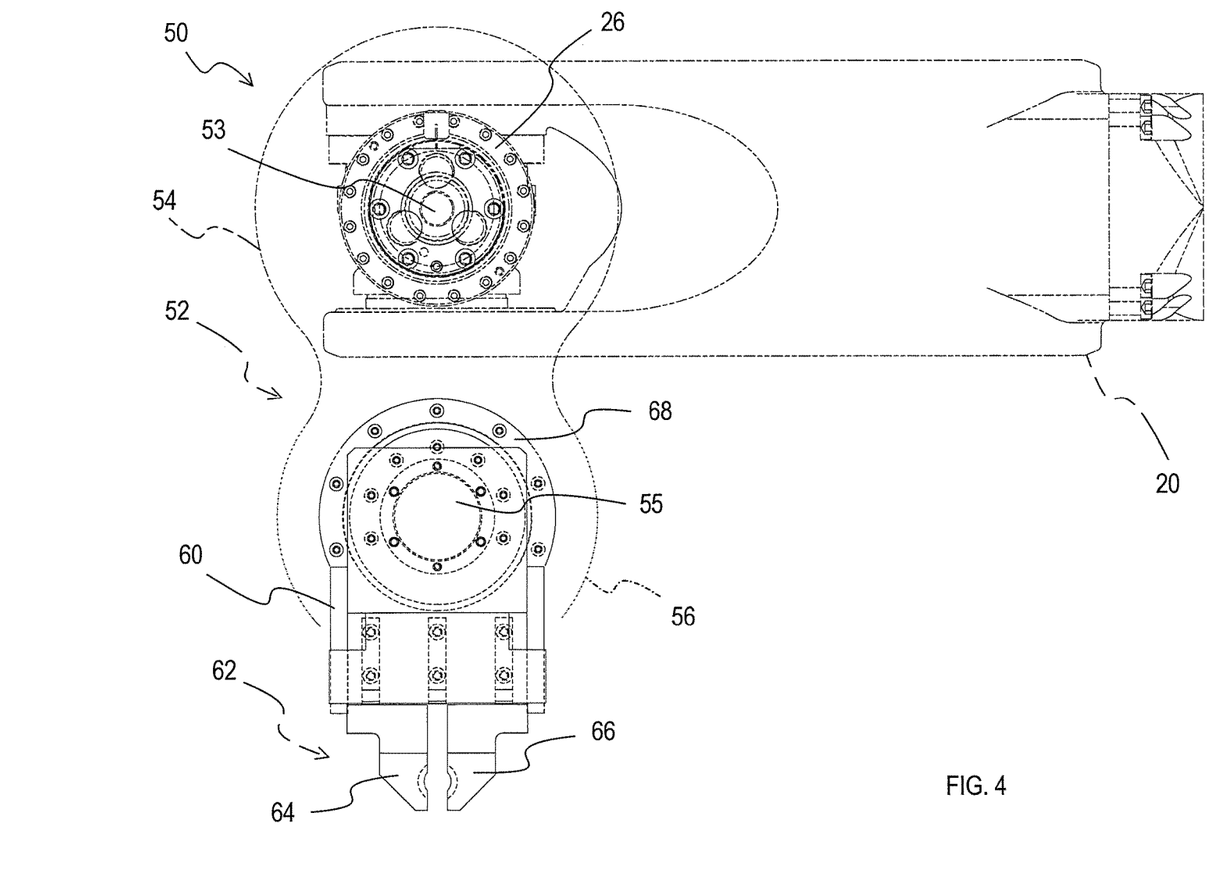
FIG. 4 is a view showing a schematic internal configuration of a gear box provided to the chuck unit.

As shown in FIG. 3 and FIG. 4, the chuck unit 50 is a unit to hold the workpiece 3, and is mounted to the hand distal end 28 of the hand attachment portion 26.

The chuck unit 50 comprises a gear box 52, a bracket 60, and a chuck mechanism 62.

The gear box 52, which is a well-known gear box configured such that a rotation number of output is increased more than a rotation number of input, comprises an input gear 54, an output gear 56, and a casing 58.

The input gear 54 is a gear to be coupled to the hand attachment portion 24. The output gear 56 is a gear to be coupled to an output shaft 55. A gear ratio between the input gear 54 and the output gear 56 is adjusted such that a rotation number of the output gear 56 is increased more than a rotation number of a rotary shaft (hereinafter referred to as a "distal rotary shaft") 53 of the sixth joint 40. The gear ratio is adjusted, specifically, such that the output shaft 55 rotates at least 360 degrees while the distal rotary shaft 53 rotates up to a maximum rotation angle of the distal rotary shaft 53.

Also, in the gear box 52, a center distance from a center of the input gear 54 to a center of the output gear 56 is set such that the workpiece 3 held by the chuck unit 50 does not interfere with the articulated arm 12.

The casing 58 is coupled to the distal rotary shaft 53, and houses the input gear 54 and the output gear 56.

The chuck mechanism 62 is a well-known mechanism that comprises a first claw portion 64 and a second claw portion 66 and holds the workpiece 3 by sliding at least one of the first claw portion 64 or the second claw portion 66. A power to slide the at least one of the first claw portion 64 or the second claw portion 66 may be pneumatic, hydraulic, or electric. Also, control of the sliding of the at least one of the first claw portion 64 or the second claw portion 66 may be performed by the robot controller 42 or may be performed by the control unit 90.

The bracket 60 is a member to couple the gear box 52 and the chuck mechanism 62. One end of the bracket 60 is coupled to the output shaft 55 through a bearing 68 so as to be rotatable relative to the casing 58. The chuck mechanism 62 is secured to the other end of the bracket 60 opposite to the one end coupled to the output shaft 55.

That is, the chuck mechanism 62 holds the workpiece 3 while being rotatable relative to the casing 58.

The chuck unit 50 conveys the workpiece 3 held by the chuck mechanism 62 in accordance with a movement of the articulated arm 12. During the conveyance, when the sixth joint 40 of the robot 10 turns, the distal rotary shaft 53 in the chuck unit 50 rotates depending on a rotation angle of the distal rotary shaft 53 around a center of the workpiece 3, which is being held, as a rotation center. Since the rotation angle of the distal rotary shaft 53 is a maximum of "360 degrees," the chuck unit 50 enables to reduce interference of the workpiece 3 with the articulated arm 12, and thus to improve a degree of freedom in twisting operation of the workpiece 3.

<Bending Mechanism>

Next, the bending mechanisms 70 and 80 will be described with reference to FIG. 2.

Each of the first bending mechanism 70 and the second bending mechanism 80 is provided as a separate component from the robot 10 and the chuck unit 50.

The first bending mechanism 70 and the second bending mechanism 80 have the same configuration except for their different installation locations. Thus, a description will be given of a configuration of the first bending mechanism 70, whereas the second bending mechanism 80 will be assigned the same reference numerals and will not be described here.

The first bending mechanism 70 comprises a bending die 72, a clamping die 74, and a power generation mechanism 76.

The bending die 72 is a die formed in accordance with a bending radius of the workpiece 3. The bending die 72 is secured to a bending mechanism base 78. The clamping die 74 is a die to engage with the bending die 72. The clamping die 74 is configured to be movable on the bending mechanism base 78 in accordance with a driving force from the power generation mechanism 76.

The power generation mechanism 76 generates the driving force to drive the clamping die 74. The driving force is provided to both of the bending mechanism 70 and the bending mechanism 80.

Specifically, the power generation mechanism 76 may comprise, for example, a hydraulic pump or a pneumatic pump. The power generation mechanism 76 is driven in accordance with a control signal from the robot controller 42.

That is, the first bending mechanism 70 and the second bending mechanism 80 each bend the workpiece 3 by clamping the workpiece 3 with the bending die 72 and the clamping die 74.

Further, the first bending mechanism 70 and the second bending mechanism 80 are arranged individually in a space reachable by the workpiece 3 that is held by the chuck unit 50 coupled to one end of the articulated arm 12. Arrangement positions of the first bending mechanism 70 and the second bending mechanism 80 may be appropriately determined depending on a bending shape of the workpiece 3.

<Control Unit>

Figure 5:
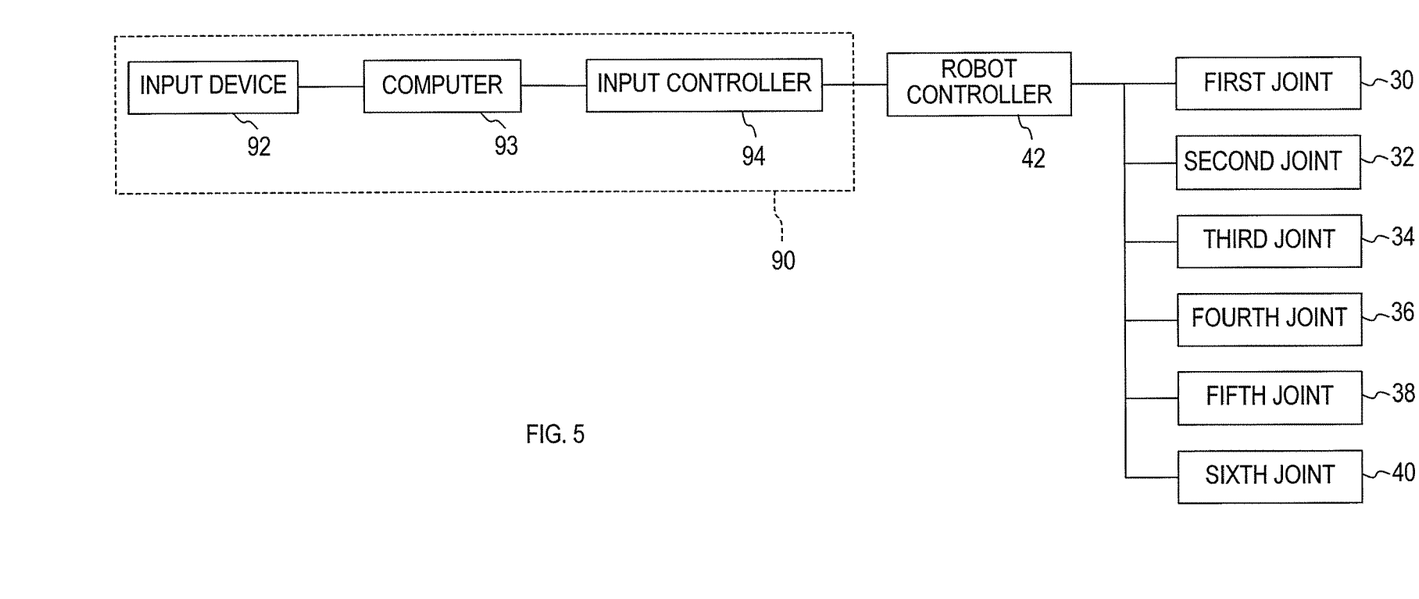
FIG. 5 is a block diagram showing a control system of the bending apparatus.

As shown in FIG. 1 and FIG. 5, the control unit 90 comprises an input device 92, a computer 93 coupled to the input device 92, and an input controller 94.

The input device 92 is a device to receive an input of information.

The computer 93 is a well-known computer that processes the information received by the input device 92.

The input controller 94 comprises a well-known microcomputer comprising a ROM, a RAM, and a CPU.

The ROM of the input controller 94 stores a processing program to enable the input controller 94 to execute a data generation process, which is to be executed by the control unit 90, in a bending process to bend the workpiece 3 into a desired shape. The data generation process mentioned here is a process to generate operation data of the robot 10 in order to achieve a desired bending shape of the workpiece 3 inputted through the input device 92.

Further, the bending process includes a working process to be executed by the robot controller 42 in addition to the data generation process. Through execution of the working process by the robot controller 42, the chuck unit 50, the robot 10, and the bending mechanisms 70, 80 are driven, and the workpiece 3 is processed into a desired shape.

<Bending Process>

Figure 6:
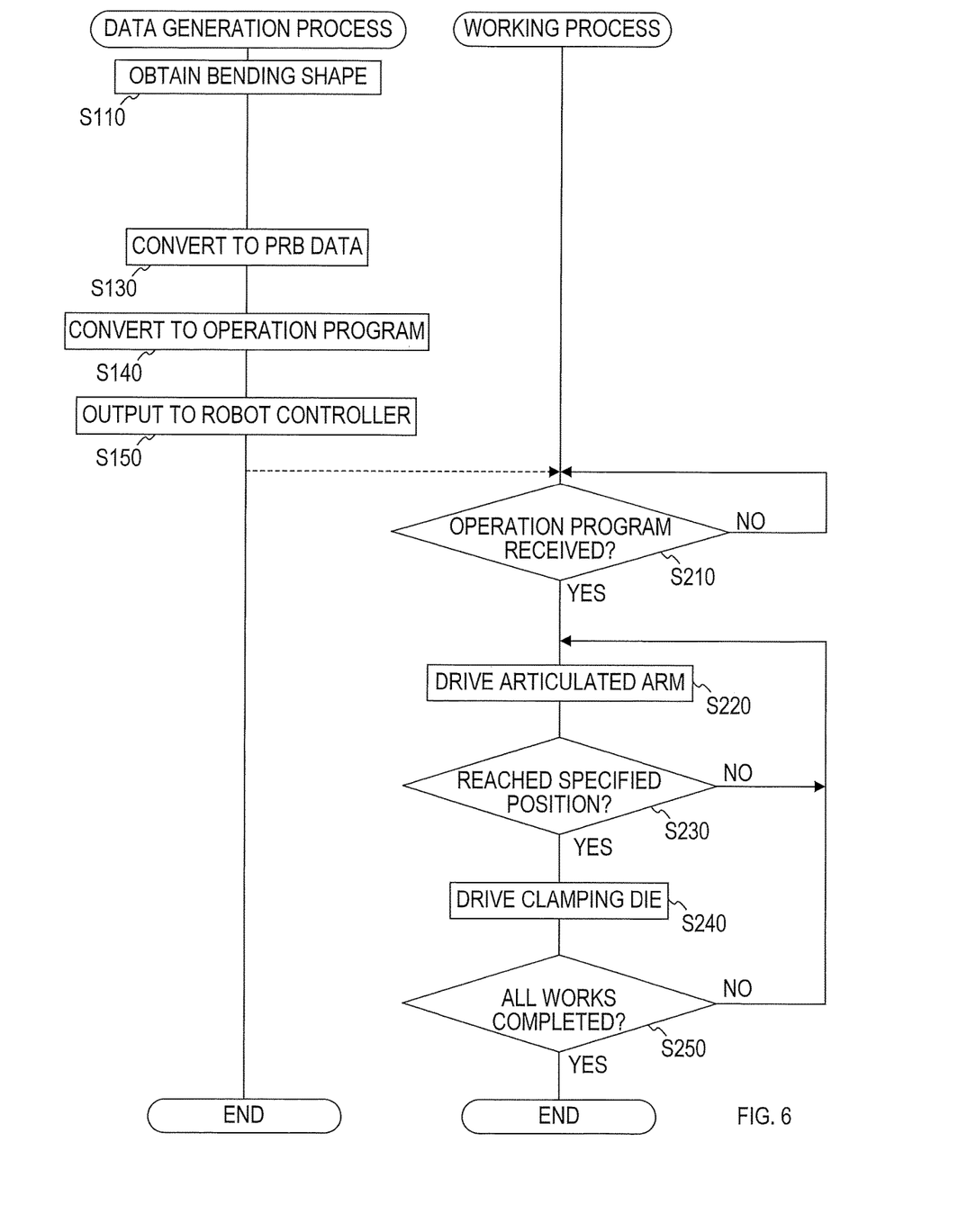
FIG. 6 is a flowchart showing procedures of processes executed by an input controller and a robot controller.

The bending process is started when a start command is inputted through a start button coupled to the robot controller 42.

When the data generation process, which is included in the bending process, is started, the input controller 94 obtains a bending shape of the workpiece 3 that is inputted through the computer 93 coupled to the input device 92, as shown in FIG. 6 (S110). The bending shape obtained in S110 is a bending shape of the workpiece 3 desired by a user of the bending apparatus 1, that is, a desired bending shape.

The input controller 94 converts XYZ data representing the bending shape obtained in S110 in an orthogonal coordinate system to PRB data (S130). The PRB data mentioned here is well-known data to perform bending of the workpiece 3 so as to achieve a desired shape. The PRB data is operation data representing a "feeding" operation and a "twisting" operation of the workpiece 3 by the robot 10, and "bending" operations as operations by the clamping dies 74 of the bending mechanisms 70, 80.

In the data generation process, the input controller 94 converts the PRB data generated in S130 to an operation program for the robot 10 (S140). Further, in the data generation process, the input controller 94 outputs the operation program generated in S140 to the robot controller 42 (S150).

Then, the present data generation process is terminated.

Whereas, in the working process included in the bending process, the robot controller 42 determines whether the operation program has been received (S210). If a determination result in S210 shows that the operation program has not been received (S210: NO), the robot controller 42 waits until the operation program is received.

Once the operation program is received (S210: YES), the robot controller 42 drives the articulated arm 12 in accordance with the operation program (S220). Also, the robot controller 42 determines whether the workpiece 3 held by the chuck mechanism 62 has reached a position specified by the operation program (S230).

If a determination result in S230 shows that the workpiece 3 held by the chuck mechanism 62 has not reached the position specified by the operation program (S230: NO), the present working process returns to S220. If the workpiece 3 has reached the specified position (S230: YES), the robot controller 42 drives the clamping die 74 such that the workpiece 3 is clamped by the bending die 72 and the clamping die 74 (S240).

In S240, the robot controller 42 outputs a control signal to the power generation mechanism 76. The power generation mechanism 76 that has received the control signal drives the clamping die 74 of one of the first bending mechanism 70 and the second bending mechanism 80, depending the bending shape, in accordance with a bending angle specified by the operation program.

Subsequently in the working process, the robot controller 42 determines whether all bending works of the single workpiece 3 specified in the operation program have been completed (S250). If all the bending works have not been completed (S250: NO), the working process returns to S220.

In contrast, if all the bending works have been completed (S250: YES), the present working process is terminated.

[Effects of Embodiment]

As described above, the bending apparatus 1 achieves movement (conveyance) of the workpiece 3 by the articulated arm 12 of the robot 10.

Particularly, the articulated arm 12 of the robot 10 is a six-axis vertical multi-articulated robot that comprises both bending joints and rotary joints. According to the bending apparatus 1, therefore, a degree of freedom in the operation of the articulated arm 12 can be more surely improved.

Also, the bending apparatus 1 enables an improved degree of freedom of movement (conveyance) of the chuck mechanism 62 that is holding the workpiece 3 as compared with a movement of a chuck on a rail in conventional techniques.

Thus, the bending apparatus 1 can achieve increased variations in the point of bending and the angle of bending in a radial direction in the single workpiece 3.

Further, according to the bending apparatus 1, the plurality of bending mechanisms 70 and 80 are arranged. By using respective different bending radii for the bending die 72 and the clamping die 74 in the bending mechanism 70, and for the bending die 72 and the clamping die 74 in the bending mechanism 80, or using reversed bending directions in the bending mechanism 70 and in the bending mechanism 80, variations in the bending shape of the single workpiece 3 can be increased.

In other words, the bending apparatus 1 can achieve an improved degree of freedom in bending of the workpiece 3 as compared with conventional techniques.

Moreover, the bending apparatus 1 enables driving of the robot 10, the chuck mechanism 62, and the bending mechanisms 70 and 80 in an interlocking manner. Accordingly, the bending apparatus 1 can achieve bending of the workpiece 3 with higher accuracy.

Other Embodiments

Although one embodiment of the present disclosure has been described above, the present disclosure should not be limited to the aforementioned embodiment, but may be practiced in various forms within the scope of the subject matter of the present disclosure.

For example, the number of axes of the robot 10 in the aforementioned embodiment is "6 axes," the number of axes of the robot in the present disclosure should not be limited to "6 axes." For example, the number of axes of the robot 10 may be "7 axes" or more, or may be "4 axes" or "5 axes." That is, the robot of the present disclosure may be any robot having a plurality of axes.

Figure 7:
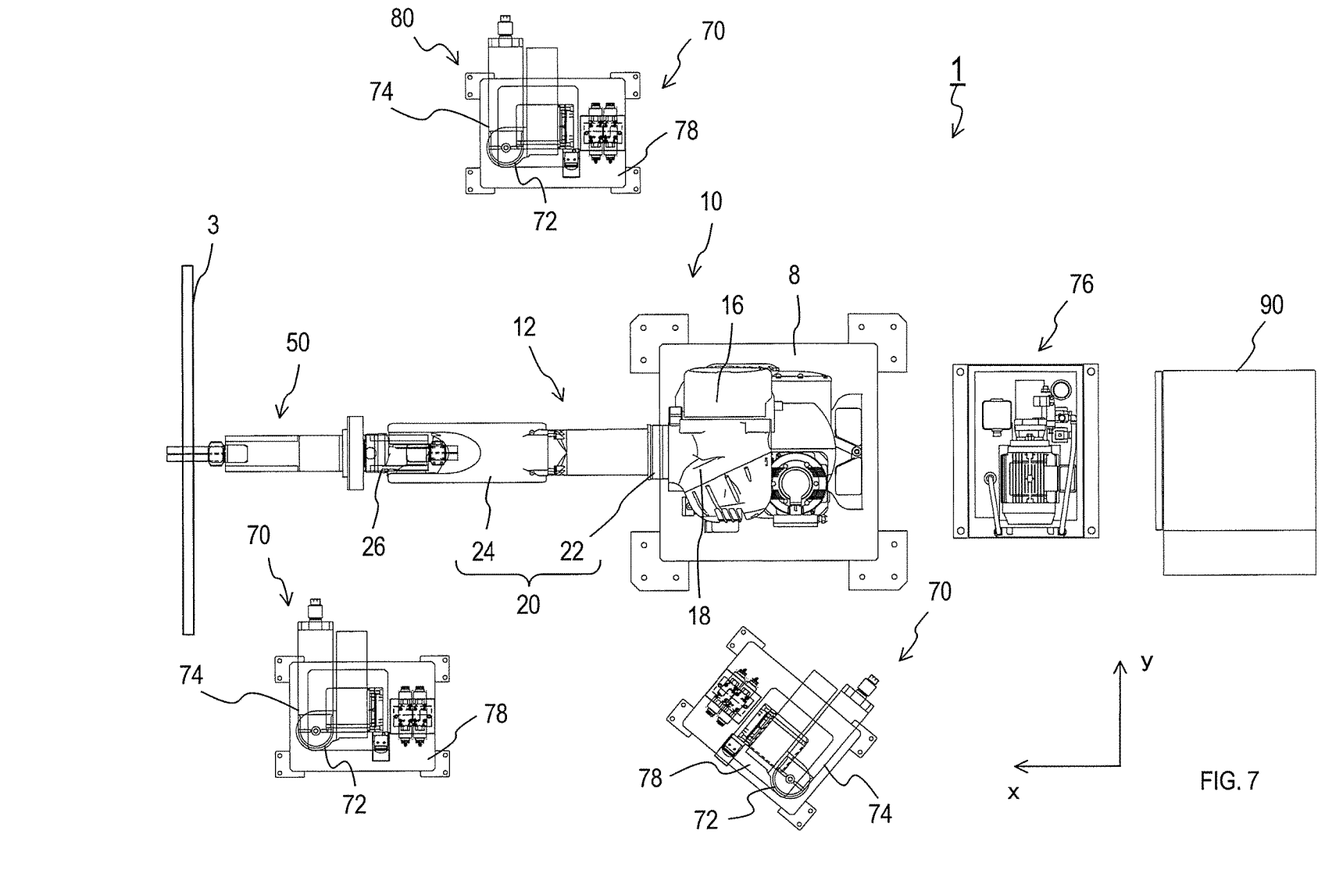
FIG. 7 is a schematic plan view of a bending apparatus in a modified example.

Also, although two bending mechanisms are provided in the aforementioned embodiment, three or more bending mechanisms may be provided as shown in FIG. 7.

Further, although the power generation mechanism 76 of the aforementioned embodiment is driven in accordance with the control signal from the robot controller 42, the power generation mechanism 76 may be driven in accordance with the control signal from input controller 92 in the control unit 90.

Moreover, although the input controller 94 obtains the bending shape of the workpiece 3 through the computer 93 coupled to the input device 92 in the aforementioned embodiment, a source for obtaining the bending shape of the workpiece 3 is not limited to the computer 93 coupled to the input device 92 but may be, for example, the input device 92 itself.

It is to be noted that a form, in which a part of the configuration of the aforementioned embodiment is omitted, may be an embodiment of the present disclosure. Also, a form configured by appropriately combining the aforementioned embodiment and a modified example may be an embodiment of the present disclosure. Further, any form within the scope defined by the language of the claims may be included in embodiments of the present disclosure.

The invention claimed is:

1. A bending apparatus for bending a workpiece having an elongated shape, the bending apparatus comprising:
   a robot with an articulated arm;
   a chuck mechanism coupled to a distal rotary shaft at one end of the articulated arm through a gear box and a bracket, and configured to hold the workpiece; and
   a plurality of bending mechanisms each comprising a bending die and a clamping die to engage with the bending die, and configured to bend the workpiece by clamping the workpiece with the bending die and the clamping die,
   wherein the plurality of bending mechanisms are each provided as a separate component from the robot and the chuck mechanism, and are arranged in a space reachable by the workpiece held by the chuck mechanism,
   wherein the gear box comprises an input gear, an output gear, and a casing, the input gear being coupled to the distal rotary shaft, and the output gear being coupled to an output shaft,
   wherein a gear ratio between the input gear and the output gear is adjusted such that a rotation number of the output gear is increased more than a rotation number of the distal rotary shaft, and
   wherein one end of the bracket is coupled to the output shaft through a bearing so as to be rotatable relative to the casing.

2. The bending apparatus according to claim 1, further comprising a controller configured to control driving of the robot, the chuck mechanism, and the plurality of bending mechanisms;
   wherein the controller is configured to drive the articulated arm such that the workpiece held by the chuck mechanism is moved to a position at which the workpiece becomes clampable by the bending die and the clamping die, and to control the driving of the robot, the chuck mechanism, and the plurality of bending mechanisms so as to cause the bending die and the clamping die to clamp the workpiece.

3. The bending apparatus according to claim 2, wherein the controller is located inside the robot.

4. The bending apparatus according to claim 2, wherein the robot comprises a base portion, and the controller is provided in the base portion.

5. The bending apparatus according to claim 2, wherein; the controller is configured to receive a computer program converted from operation data; and the operation data represents a feeding operation and a twisting operation of the workpiece performed by the robot, and represents a bending operation performed by the clamping die.

6. The bending apparatus according to claim 1, wherein the plurality of bending mechanisms comprises two bending mechanisms.

7. The bending apparatus according to claim 1, wherein the plurality of bending mechanisms comprises three or more bending mechanisms.

8. The bending apparatus according to claim 1, wherein the articulated arm comprises at least one bending joint configured to perform a bending motion and at least one rotary joint configured to perform a turning motion.

9. The bending apparatus according to claim 1, wherein the robot is a six-axis vertical multi-articulated robot.

10. The bending apparatus according to claim 1, wherein: the plurality of bending mechanisms comprises a first bending mechanism and a second bending mechanism, the first bending mechanism is oriented in a first orientation, and the second bending mechanism is oriented in a second orientation that is offset by a predetermined angle from the first orientation.

11. The bending apparatus according to claim 10, wherein the plurality of bending mechanisms further comprises a third bending mechanism oriented in the first orientation.

12. The bending apparatus according to claim 1, wherein the gear ratio is adjusted such that the output shaft rotates at least 360 degrees while the distal rotary shaft rotates up to a maximum rotation angle of the distal rotary shaft.

13. The bending apparatus according to claim 1, wherein a center distance from a center of the input gear to a center of the output gear is set such that the workpiece held by the chuck mechanism does not interfere with the articulated arm.

14. The bending apparatus according to claim 1, wherein bending dies and clamping dies have different respective bending radii among different bending mechanism of the plurality of bending mechanisms.

15. The bending apparatus according to claim 1, wherein reversed bending directions are set in the plurality of bending mechanisms.

16. A bending apparatus for bending a workpiece having an elongated shape, the bending apparatus comprising:
   a robot with an articulated arm, the articulated arm comprising a distal rotary shaft;
   a chuck unit coupled to one end of the articulated arm, the chuck unit comprising a gear box, a bracket, and a chuck mechanism, the bracket coupling the gear box with the chuck mechanism, and the chuck mechanism being configured to hold the workpiece; and
   a plurality of bending mechanisms each comprising a bending die and a clamping die to engage with the bending die, and configured to bend the workpiece by clamping the workpiece with the bending die and the clamping die, wherein the plurality of bending mechanisms are each provided as a separate component from the robot and the chuck mechanism, and are arranged in a space reachable by the workpiece held by the chuck mechanism, wherein the gear box comprises an input gear, an output gear, and a casing, wherein the casing is coupled to the distal rotary shaft and houses the input gear and the output gear, wherein the output gear is coupled to an output shaft, wherein a gear ratio between the input gear and the output gear is adjusted such that a rotation number of the output gear is increased more than a rotation number of the distal rotary shaft, and wherein one end of the bracket is coupled to the output shaft through a bearing so as to be rotatable relative to the casing.

* * * * *